(12) United States Patent
Bäumel

(10) Patent No.: US 6,991,089 B2
(45) Date of Patent: Jan. 31, 2006

(54) COOLING STATION FOR DISK-SHAPED SUBSTRATES

(75) Inventor: Reinhard Bäumel, Weng (DE)

(73) Assignee: Krauss-Maffei Kunststofftechnik GmbH, München (DE)

(*) Notice: Subject to any disclaimer, the term of this patent is extended or adjusted under 35 U.S.C. 154(b) by 264 days.

(21) Appl. No.: 10/309,440

(22) Filed: Dec. 4, 2002

(65) Prior Publication Data

US 2003/0076622 A1 Apr. 24, 2003

Related U.S. Application Data

(63) Continuation of application No. PCT/EP01/06323, filed on Jun. 2, 2001.

(30) Foreign Application Priority Data

Jun. 13, 2000 (DE) .................................... 100 28 399

(51) Int. Cl.
*B65G 33/06* (2006.01)

(52) U.S. Cl. ................... 198/663; 198/662; 198/625
(58) Field of Classification Search ............ 198/608, 198/611, 625, 624, 467.1, 657, 662, 663, 198/669, 661, 817

See application file for complete search history.

(56) References Cited

U.S. PATENT DOCUMENTS 3,191,762 A   6/1965 Brietzke
3,791,508 A * 2/1974 Osborne et al. ............ 198/625
4,761,897 A   8/1988 Tazaki et al.
5,120,189 A * 6/1992 Breda et al. ............. 198/467.1
6,241,079 B1 * 6/2001 Weber et al. ................ 198/817

FOREIGN PATENT DOCUMENTS

| DE | 26 29 951 A    |   | 1/1978 |          |
|----|----------------|---|--------|----------|
| DE | 33 27 121 A1   |   | 2/1985 |          |
| DE | 198 04 074 A1  |   | 8/1999 |          |
| EP | 0 919 999 A2   |   | 6/1999 |          |
| JP | 3-182413       | * | 8/1991 | ........ 198/663 |
| NL | 8 702 462 A    |   | 5/1989 |          |

* cited by examiner

*Primary Examiner*—James R. Bidwell
(74) *Attorney, Agent, or Firm*—Henry M. Feiereisen

(57) ABSTRACT

A cooling station for data carrier disks, in particular for injection-molded substrates of optically readable data carriers, such as CD, CD-R, DVD, CD single, DVD single and the like, has at least three rotatable cooling spindles which are arranged in spaced-apart parallel relationship such that a substrate bears simultaneously upon all cooling spindles. Each cooling spindle has at least two threads with thread grooves of different width to thereby accommodate in the same cooling station, e.g. CD substrates and DVD substrates. As an alternative, or in addition, four or more cooling spindles may be provided and arranged in such a manner that respectively three cooling spindles are provided for transport of substrates with a particular substrate diameter. In this way, substrates of different diameter, e.g., standard CD and CD single, can be accommodated in a same cooling station.

17 Claims, 2 Drawing Sheets

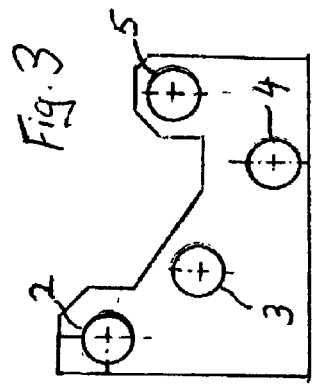
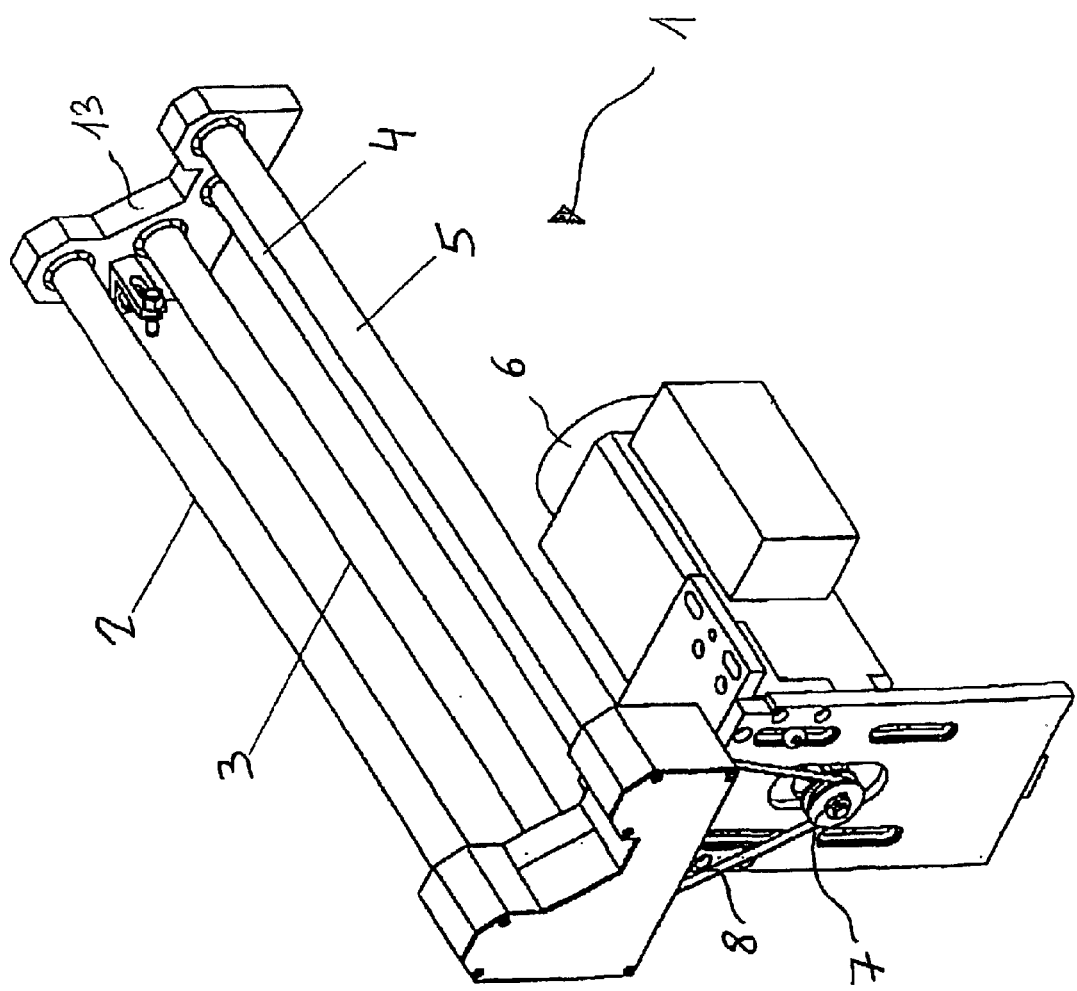

COOLING STATION FOR DISK-SHAPED SUBSTRATES

CROSS-REFERENCES TO RELATED APPLICATIONS

This application is a continuation of prior filed copending PCT International application no. PCT/EP01/06323 filed Jun. 2, 2001, which designated the United States and on which priority is claimed under 35 U.S.C. §120, the disclosure of which is hereby incorporated by reference.

This application claims the priority of German Patent Application, Ser. No. 100 28 399.3, filed Jun. 13, 2000, pursuant to 35 U.S.C. 119(a)–(d), the disclosure of which is incorporated herein by reference.

BACKGROUND OF THE INVENTION

The present invention relates, in general, to a cooling station for disk-shaped substrates, in particular for substrates of optically readable data carriers, such as CD, CD-R, DVD, CD single, DVD single and the like.

Production of optically readable data carriers of the afore-stated type involves the use of an injection molding machine for making blanks from a plastic granulate, normally polycarbonate, which are processed in further steps until a finished CD, CD-R, DVD, etc. is received at the end of the production line. After leaving the injection molding machine, the blanks are still hot and must be cooled down to room temperature before further treatment. Typically, the temperature of the blanks at transfer from the injection molding machine and placement in the cooling station is about 100° C. When being removed from the cooling station, the blank should have a process temperature of about 22° C.

Conventional cooling stations, in which the blanks are transported by means of cooling spindles along a cooling section, include three cooling spindles which are arranged in symmetric relationship and have each a thread and a particular width of the thread groove.

These known cooling stations suffer shortcomings because the existent cooling station has to be modified or replaced with a cooling station suited for a new article, when the production changes, for example, from CD to DVD or from CD to single CD. This results in undesired shutdown periods of the production line.

It would therefore be desirable and advantageous to provide an improved cooling station which obviates prior art shortcomings and which is equally applicable for substrates of optically readable data carriers with different substrate dimensions, i.e. without need for modifications.

SUMMARY OF THE INVENTION

According to one aspect of the present invention, a cooling station for disk-shaped substrates, in particular for substrates of optically readable data carriers, such CD, CD-R, DVD, CD single, DVD single and the like, includes at least three rotatable cooling spindles arranged in spaced-apart parallel relationship such that a substrate bears simultaneously upon all cooling spindles, wherein each of the cooling spindles has at least two threads with thread grooves of different width.

According to another feature of the present invention, the thread groove of one of the threads is about 0.6 mm width and the thread groove of the other one of the threads is about 1.2 mm width.

According to another feature of the present invention, the cooling spindles are arranged in asymmetric relationship.

According to another aspect of the present invention, a cooling station for disk-shaped substrates, in particular for substrates of optically readable data carriers, like CD, CD-R, DVD, CD single, DVD single and the like, includes at least four rotatable cooling spindles arranged in spaced-apart parallel relationship in such a manner that respectively three cooling spindles are provided for transport of substrates with a particular substrate diameter.

According to another feature of the present invention, a first group of three cooling spindles is provided for substrates with a first diameter, and a second group of three cooling spindles is provided for substrates with a second diameter, wherein the first diameter is smaller than the second diameter, wherein the at least four cooling spindles are so positioned that two outer cooling spindles, as viewed in circumferential direction, of the first group form with a further one of the cooling spindles the second group of cooling spindles.

The three cooling spindles of the first group have axes which define approximate corner points of a triangle turned upside down, wherein the further one of the cooling spindles is positioned above the corner points, and defines with two upper cooling spindles of the first group the second group of cooling spindles for substrates with the second diameter.

According to another feature of the present invention, a first group of three cooling spindles is provided for substrates with a diameter of about 120 mm, and a second group of three cooling spindles is provided for substrates with a diameter of about 80 mm.

A cooling station of the present invention enables an increased flexibility of the production of optically readable data carriers.

According to another feature of the present invention, each of the four cooling spindles may have at least two threads with thread grooves of different width. As a consequence, a single cooling station can be used for transport of all currently processed standard sizes of blanks of optically readable data carriers from the transfer at the injection molding machine up to the withdrawal for further processing and for cooling to process temperature: CD 120 mm Ø, 1.2 mm size; DVD 120 mm Ø, 0.6 mm size; CD 80 mm Ø, 1.2 mm size and DVD 80 mm Ø, 0.6 mm size.

According to another feature of the present invention, a first group of three cooling spindles is provided for substrates with a first diameter, and a second group of three cooling spindles is provided for substrates with a second diameter, wherein the cooling spindles of each of the first and second groups of cooling spindles are arranged in asymmetric relationship. This has the advantage that the blanks are prevented from continuously contacting the same location of their outer edge, when rolling upon the cooling spindles, i.e. the blank rests always at a different position in the spindles during a revolution. This results, advantageously, to a more even cooling of the blanks.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 a perspective illustration of a cooling station according to the present invention with four cooling spindles for two substrate diameters;

FIG. 3 is a sectional view of the cooling station, showing in particular the relative disposition of the cooling spindles.

DETAILED DESCRIPTION OF PREFERRED EMBODIMENTS

Figure 2:
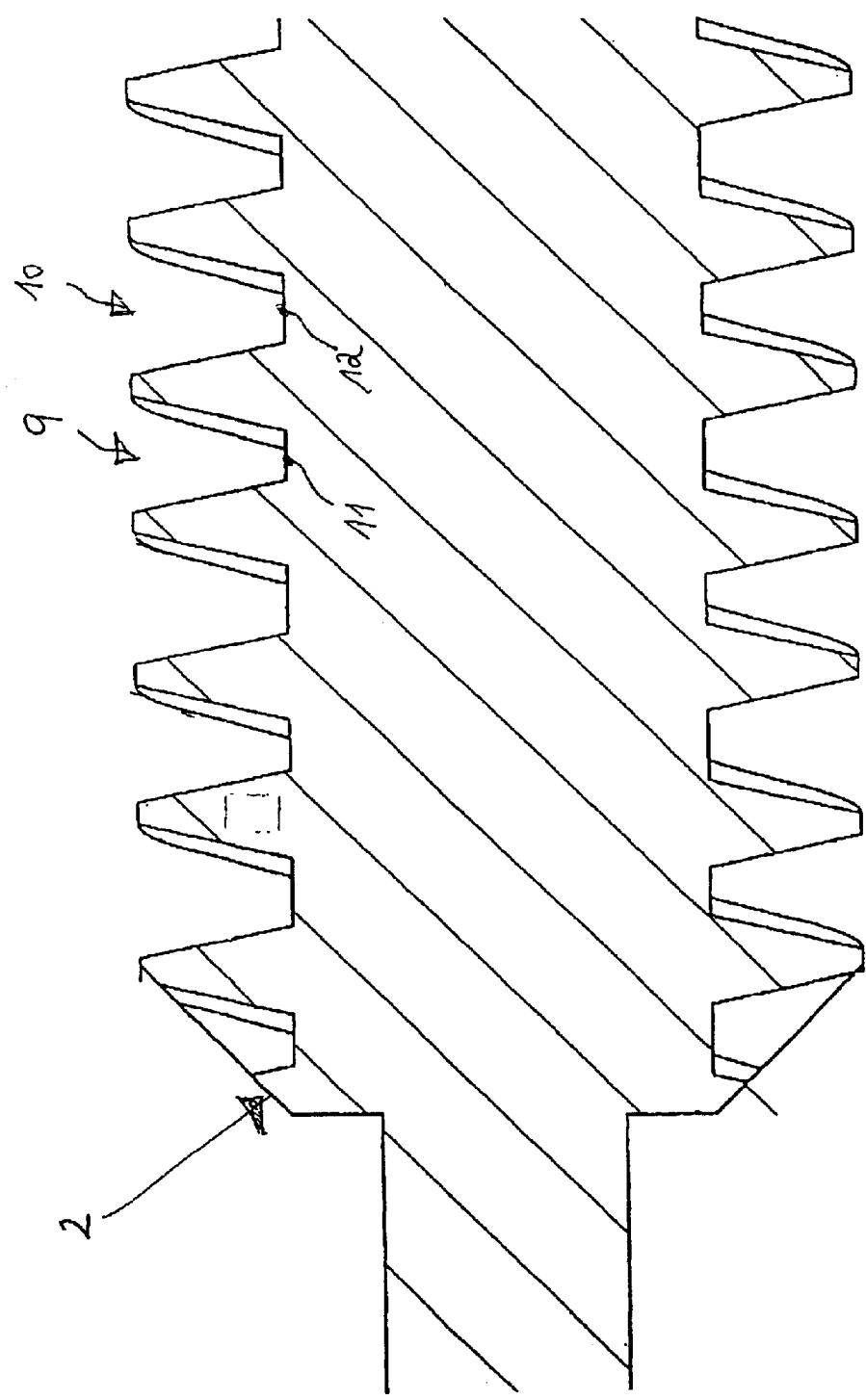
FIG. 2 a cross section through one of the cooling spindles of FIG. 1.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a perspective illustration of a cooling station, generally designated by reference numeral 1 and including four identical cooling spindles 2, 3, 4, 5 for transport of two substrates of different diameters. The cooling spindles 2, 3, 4, 5 are driven on one side by a drive unit which includes an electromotor 6 operating the cooling spindles 2, 3 4, 5 via a pinion 7 and a toothed belt 8. On their opposite side, the cooling spindles 2, 3, 4, 5 are only supported in an end plate 13. Of course, the drive unit must contain much additional apparatus, which does not appear in the foregoing Figures, e.g., gears. Likewise, the cooling station must contain much additional apparatus, which does not appear in the foregoing Figures, e.g. a cooler. However, these components, like much other necessary components, are not part of the invention, and have been omitted from the Figures for the sake of simplicity.

The cooling spindles 3, 4, 5 form a first group of cooling spindles for the substrates or blanks with a diameter 80 mm, whereas the cooling spindles 2, 3, 5 form a second group of cooling spindles for the blanks with a diameter of 120 mm. It will also be understood by persons skilled in the art that the terms "substrate" and "blank" are used synonymous in the disclosure. The cooling spindles in each group are arranged in asymmetric relationship, as shown in FIG. 3. The axes of the cooling spindles 3, 4 and 5 do not form precisely the corners of an isosceles triangle turned upside down but rather deviate slightly therefrom. This accomplishes that the blanks, in this case the ones with a diameter of 80 mm, bear always upon a different position in the spindles during a revolution. In analogous manner, the cooling spindles 2, 3 and 5 are arranged in asymmetric relationship.

FIG. 2 shows a cross section of cooling spindle 2 of FIG. 1. As the cooling spindles 2, 3, 4, 5 are of an identical construction, it will be understood by persons skilled in the art that a description of cooling spindle 2 is equally applicable to the other cooling spindles 3, 4, 5. The cooling spindle 2 is of the trapezoidal or Acme thread type and includes two threads 9, 10 which do not extend symmetrically to one another so that two thread grooves 11 and 12 of different width are formed with a width respectively conforming to the size of the blanks to be transported. The thread 9 with the narrow thread groove 11 is used for the blanks of the size 0.6 mm (CD blanks). The thread 10 with the wider thread grooves 12 is used for the blanks of the size 1.2 mm (DVD blanks).

The cooling station according to the present invention is suitable for passage of blanks of different diameter and different size or thickness through the cooler, without modifications. The present invention is described with reference to substrates for optically readable data carriers. Of course, the invention is equally applicable for the transport and/or cooling of other substrates of different diameters or different size.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A cooling station for disk-shaped substrates, in particular for substrates of optically readable data carriers, such CD, CD-R, DVD, CD single, DVD single, comprising:
   at least three cooling spindles arranged in spaced-apart parallel relationship such that a substrate bears simultaneously upon all cooling spindles, each of the cooling spindles having at least two threads with thread grooves of different width; and
   drive means for rotating the cooling spindles.

2. The cooling station of claim 1, wherein the thread groove of one of the threads is about 0.6 mm width and the thread groove of the other one of the threads is about 1.2 mm width.

3. The cooling station of claim 1, wherein the cooling spindles are arranged in asymmetric relationship.

4. A cooling station for disk-shaped substrates, in particular for substrates of optically readable data carriers, like CD, CD-R, DVD, CD single, DVD single, comprising:
   at least four cooling spindles arranged in spaced-apart parallel relationship so that groups of three cooling spindles are selectable for transport of substrates of different substrate diameter; and
   drive means for rotating the cooling spindles.

5. The cooling station of claim 4, wherein a first group of three cooling spindles is provided for substrates with a first diameter, and a second group of three cooling spindles is provided for substrates with a second diameter, wherein the first diameter is smaller than the second diameter, wherein the at least four cooling spindles are so positioned that two outer cooling spindles, as viewed in circumferential direction, of the first group form with a further one of the cooling spindles the second group of cooling spindles.

6. The cooling station of claim 5, wherein the three cooling spindles of the first group have axes which define approximate corner points of a triangle turned upside down, wherein the further one of the cooling spindles is positioned above the corner points, and defines with two upper cooling spindles of the first group the second group of cooling spindles for substrates with the second diameter.

7. The cooling station of claim 4, wherein a first group of three cooling spindles is provided for substrates with a diameter of about 120 mm, and a second group of three cooling spindles is provided for substrates with a diameter of about 80 mm.

8. The cooling station of claim 4, wherein each of the cooling spindles has at least two threads with thread grooves of different width.

9. The cooling station of claim 8, wherein the thread groove of one of the threads is about 0.6 mm width and the thread groove of the other one of the threads is about 1.2 mm width.

10. The cooling station of claim 4, wherein a first group of three cooling spindles is provided for substrates with a first diameter, and a second group of three cooling spindles is provided for substrates with a second diameter, wherein the cooling spindles of each of the first and second groups of cooling spindles are arranged in asymmetric relationship.

11. A cooling station for a disk-shaped substrate, comprising at least four rotatable cooling spindles arranged in spaced-apart parallel relationship to define two groups of three cooling spindles for transport of substrates with different substrate diameter, whereby two of the three cooling spindles form part of both groups of cooling spindles.

12. The cooling station of claim 11, wherein three of the cooling spindles have axes which define approximate corner points of a triangle turned upside down to define one of the two groups, wherein the fourth one of the cooling spindles is positioned above the corner points, and defines with two adjacent ones of the three cooling spindles the other one of the groups of cooling spindles.

13. The cooling station of claim 11, wherein the one group of three cooling spindles is provided for substrates with a diameter of about 120 mm, and the other group of three cooling spindles is provided for substrates with a diameter of about 80 mm.

14. The cooling station of claim 11, wherein each of the cooling spindles has at least two threads with thread grooves of different width.

15. The cooling station of claim 14, wherein the thread groove of one of the threads is about 0.6 mm width and the thread groove of the other one of the threads is about 1.2 mm width.

16. The cooling station of claim 11, wherein the cooling spindles of each of the two groups of cooling spindles are arranged in asymmetric relationship.

17. The cooling station of claim 4, wherein the cooling spindles are supported immobile relative to one another.

* * * * *